United States Patent
Fornage

(10) Patent No.: US 12,288,988 B2
(45) Date of Patent: Apr. 29, 2025

(54) METHOD AND APPARATUS FOR CONTROLLING POWER GRID MEMBER BEHAVIOR

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 670 days.

(21) Appl. No.: 15/714,532

(22) Filed: Sep. 25, 2017

(65) Prior Publication Data

US 2018/0097366 A1    Apr. 5, 2018

Related U.S. Application Data

(60) Provisional application No. 62/402,325, filed on Sep. 30, 2016.

(51) Int. Cl.
| | | |
|---|---|---|
| *G06Q 50/06* | (2024.01) | |
| *G05B 13/02* | (2006.01) | |
| *G06Q 30/0207* | (2023.01) | |
| *G06Q 30/04* | (2012.01) | |
| *H02J 3/00* | (2006.01) | |

(Continued)

(52) U.S. Cl.
CPC ............ *H02J 3/381* (2013.01); *G05B 13/021* (2013.01); *G06Q 30/0223* (2013.01); *G06Q 30/04* (2013.01); *G06Q 50/06* (2013.01); *H02J 3/00* (2013.01); *H02J 3/14* (2013.01); *H02J 13/00006* (2020.01); *H02J 2203/20* (2020.01); *H02J 2310/64* (2020.01);

(Continued)

(58) Field of Classification Search
CPC ........ H02J 3/381; H02J 3/388; H02J 2300/20; H02J 3/46; H02J 2203/10; H02J 3/003; G06Q 50/06; G06Q 30/0206
See application file for complete search history.

(56) References Cited

U.S. PATENT DOCUMENTS

| | | |
|---|---|---|
| 3,842,348 A | 10/1974 | Goshy |
| 6,978,931 B2 | 12/2005 | Brobeck |

(Continued)

FOREIGN PATENT DOCUMENTS

| | | |
|---|---|---|
| CA | 1132219 A | 9/1982 |
| CA | 2392650 A1 | 1/2004 |

(Continued)

OTHER PUBLICATIONS

King, Douglas E. "Electric Power Micro-Grids: Opportunities and Challenges for an Emerging Distributed Energy Architecture." 3235912 Carnegie Mellon University, 2006. Ann Arbor: ProQuest. Web. Mar. 7, 2025 (Year: 2006).*

(Continued)

*Primary Examiner* — Michael P Harrington
(74) *Attorney, Agent, or Firm* — Moser Taboada

(57) ABSTRACT

A system and method for controlling a behavior of at least one member of a local power grid. In one embodiment, the system comprises a monitoring system, comprising at least one processor, for obtaining a measure of grid stress and deriving at least one of financial incentives and financial disincentives, based on the measure of grid stress, to cause at least one member of the local grid to change behavior.

12 Claims, 6 Drawing Sheets

(51) Int. Cl.
*H02J 3/14* (2006.01)
*H02J 3/38* (2006.01)
*H02J 13/00* (2006.01)

(52) U.S. Cl.
CPC .......... *Y02B 70/3225* (2013.01); *Y04S 20/222* (2013.01); *Y04S 50/12* (2013.01); *Y04S 50/14* (2013.01)

(56) References Cited

U.S. PATENT DOCUMENTS

| | | | |
|---|---|---|---|
| 8,583,520 | B1 | 11/2013 | Forbes |
| 8,588,991 | B1 | 11/2013 | Forbes |
| 8,941,261 | B2 | 1/2015 | Shaffer |
| 9,026,260 | B1 | 5/2015 | Thornley et al. |
| 2003/0009401 | A1* | 1/2003 | Ellis ............... G06Q 30/0283 705/35 |
| 2004/0225625 | A1* | 11/2004 | Van Gorp ............. G01D 4/004 705/412 |
| 2007/0177319 | A1* | 8/2007 | Hirst ..................... H02J 3/06 361/85 |
| 2008/0262820 | A1 | 10/2008 | Nasle |
| 2009/0281885 | A1 | 11/2009 | Castelli et al. |
| 2010/0063832 | A1 | 3/2010 | Brown |
| 2010/0179704 | A1 | 7/2010 | Ozog |
| 2010/0218108 | A1 | 8/2010 | Crabtree et al. |
| 2011/0055036 | A1 | 3/2011 | Helfan |
| 2011/0082598 | A1 | 4/2011 | Boretto et al. |
| 2011/0093127 | A1 | 4/2011 | Kaplan |
| 2011/0172837 | A1 | 7/2011 | Forbes |
| 2011/0202418 | A1 | 8/2011 | Kempton et al. |
| 2011/0231028 | A1* | 9/2011 | Ozog ..................... H02J 3/008 700/291 |
| 2012/0143385 | A1 | 6/2012 | Goldsmith |
| 2012/0144828 | A1 | 6/2012 | Lazaris |
| 2012/0150361 | A1 | 6/2012 | Lazaris |
| 2012/0150679 | A1 | 6/2012 | Lazaris |
| 2012/0193987 | A1 | 8/2012 | Siglock |
| 2012/0239219 | A1 | 9/2012 | Forbes |
| 2012/0245744 | A1 | 9/2012 | Prosser et al. |
| 2012/0245753 | A1 | 9/2012 | Forbes |
| 2012/0296482 | A1 | 11/2012 | Steven et al. |
| 2012/0326503 | A1* | 12/2012 | Birkelund ............. G06Q 50/06 307/24 |
| 2012/0326653 | A1 | 12/2012 | Godrich et al. |
| 2013/0046668 | A1 | 2/2013 | Al et al. |
| 2013/0079943 | A1 | 3/2013 | Darden, II et al. |
| 2013/0134962 | A1 | 5/2013 | Kamel et al. |
| 2013/0198847 | A1 | 8/2013 | Sampigethaya |
| 2013/0269181 | A1 | 10/2013 | McBride et al. |
| 2013/0317959 | A1 | 11/2013 | Joos et al. |
| 2013/0346768 | A1 | 12/2013 | Forbes |
| 2014/0018969 | A1* | 1/2014 | Forbes, Jr. ............. H02J 3/386 700/295 |
| 2014/0163759 | A1 | 6/2014 | Anderson et al. |
| 2014/0201109 | A1 | 7/2014 | Tilley et al. |
| 2014/0236365 | A1 | 8/2014 | Martin et al. |
| 2014/0277813 | A1 | 9/2014 | Powell et al. |
| 2014/0320125 | A1 | 10/2014 | Leeb et al. |
| 2014/0336960 | A1 | 11/2014 | Haghighat-Kashani et al. |
| 2014/0365276 | A1 | 12/2014 | Harsha et al. |
| 2015/0039149 | A1 | 2/2015 | Forbes |
| 2015/0073609 | A1 | 3/2015 | Forbes |
| 2015/0105931 | A1 | 4/2015 | Forbes |
| 2015/0149256 | A1 | 5/2015 | Forbes |
| 2015/0155713 | A1 | 6/2015 | Forbes |
| 2015/0178865 | A1 | 6/2015 | Anderson et al. |
| 2015/0261240 | A1* | 9/2015 | Mokhtari ................. H02J 3/46 713/176 |
| 2016/0248253 | A1 | 8/2016 | Zimmanck |
| 2016/0363949 | A1 | 12/2016 | Zimmanck et al. |
| 2017/0077707 | A1 | 3/2017 | Zimmanck |
| 2017/0103483 | A1* | 4/2017 | Drees ............... G06Q 10/06315 |
| 2017/0163037 | A1 | 6/2017 | Zimmanck |
| 2017/0163049 | A1 | 6/2017 | Zimmanck |
| 2017/0194792 | A1 | 7/2017 | Zimmanck et al. |
| 2017/0214248 | A1 | 7/2017 | Rowe et al. |

FOREIGN PATENT DOCUMENTS

| | | |
|---|---|---|
| CA | 2838894 A1 | 12/2012 |
| CA | 2864739 A1 | 6/2013 |
| CA | 2809011 A1 | 5/2014 |
| CN | 101368985 A | 2/2009 |
| CN | 102545087 A | 7/2012 |
| CN | 102570455 A | 7/2012 |
| CN | 202550532 U | 11/2012 |
| CN | 203289160 U | 11/2013 |
| CN | 203719492 U | 7/2014 |
| CN | 104102178 A | 10/2014 |
| DE | 102010040297 A1 | 3/2012 |
| IN | 5204/CHE/2013 | 5/2015 |
| WO | WO-2010054477 A1 | 5/2010 |
| WO | WO-2011041742 A2 | 4/2011 |
| WO | WO-2011156776 A2 | 12/2011 |
| WO | WO-2011162722 A1 | 12/2011 |
| WO | WO-2012068388 A1 | 5/2012 |
| WO | WO-2012174145 A2 | 12/2012 |
| WO | WO-2013019989 A2 | 2/2013 |
| WO | WO-2013043863 A1 | 3/2013 |
| WO | WO-2013057587 A2 | 4/2013 |
| WO | WO-2013123443 A1 | 8/2013 |
| WO | WO-2013170274 A2 | 11/2013 |
| WO | WO-2014027246 A2 | 2/2014 |
| WO | WO-2014038966 A1 | 3/2014 |
| WO | WO-2014074626 A1 | 5/2014 |
| WO | WO-2014078659 A2 | 5/2014 |
| WO | WO-2014152458 A2 | 9/2014 |
| WO | WO-2014178821 A1 | 11/2014 |
| WO | WO-2014201410 A1 | 12/2014 |
| WO | WO-2015013677 A2 | 1/2015 |
| WO | WO-2015032002 A1 | 3/2015 |
| WO | WO-2015113637 A1 | 8/2015 |

OTHER PUBLICATIONS

U.S. Appl. No. 62/286,669, filed Jan. 25, 2016, Enphase Energy Inc.
Sudarshan, "Money for Nothing: Using Peer Comparisons and Nancial Incentives to Reduce Electricity Demand in Urban Indian Households", https://www.dartmouth.edu/~neudc2012/docs/paper_259.pdf.
Brabandere, "Voltage and Frequency Droop Control in Low Voltage Grids by Distributed Generators with Inverter Front-End", Katholieke Universiteit Leuven, pp. 1-227, Oct. 2006.
Brabandere et al., "Control of Microgrids", IEEE Power Engineering Society General Meeting, pp. 1-7, 2007.
Cox, "Energy Incentives Programs Worry Valley Farmers", http://www.bakersfield.com/news/2010/11/21/energy-incentives-programs-worry-valley-farmers.html, Nov. 20, 2010.
Rocabert et al., "Control of Power Converters in AC Microgrids", IEEE Transactions on Power Electronics, vol. 27, Issue 11, pp. 4734-4749, Nov. 2012.

\* cited by examiner

METHOD AND APPARATUS FOR CONTROLLING POWER GRID MEMBER BEHAVIOR

CROSS-REFERENCE TO RELATED APPLICATIONS

This application claims benefit of U.S. provisional patent application Ser. No. 62/402,325, entitled "Method and Apparatus for Controlling Power Grid Member Behavior" and filed Sep. 30, 2016, which is herein incorporated in its entirety by reference.

BACKGROUND OF THE INVENTION

Field of the Invention

Embodiments of the present invention generally relate to power systems and, more particularly, to grids of energy generators, energy storage and energy loads.

Description of the Related Art

A conventional power grid comprises at least one energy generator, optionally at least one energy storage device, and at least one energy load. Power grids can be as small as a single residence. In many instances, a power grid will span a plurality of residences some of which may have some, but not all of the elements of a grid.

In conventional systems, there is typically a central controller that monitors, throughout the grid, the energy consumption of the energy loads, the energy generation of the energy generators and the level of storage in the storage devices. The central controller controls each element of the grid to ensure sufficient and equitable flow of energy amongst the grid members.

Power grids, whether micro- or macro-grids, have three stages of control: primary, secondary and tertiary. The primary control regulates short-term (micro-seconds to seconds) operation of the power grid through droop control. Droop control requires the grid elements to be matched to ensure frequency and voltage throughout the grid remains within strict parameters. When grid frequency and/or voltage are elevated from a nominal value, the grid has available reserves; while, a grid with reduced voltage and/or frequency is under duress. For example, if the grid frequency is lower than the nominal frequency (e.g., 60 Hz), the grid is underpowered (under duress) and additional power sources need to be added to return the grid frequency to the nominal value. On the other hand, if the grid frequency is above the nominal frequency, then power output needs to be curtailed or additional loading added to the grid to rebalance the grid. The voltage and frequency of a grid is a measure of the health of the system. Primary control algorithms using droop control are described in K. De Brabandere, Voltage and Frequency Droop Control in Low Voltage Grids By Distributed Generators With Inverter Front End (October 2006) (Ph.D. dissertation; Catholic University of Leuven).

Secondary controls regulate the system at medium term (minutes). The secondary control resets the frequency and voltage center value for each generator on the grid. When the frequency and voltage move off center and are not remedied by primary control, then the secondary control sets a new nominal value regardless of the health of the grid. Secondary control occurs by communicating the frequency and/or voltage update to all the generators on a grid. If any of them do not receive an update, the system will become imbalanced. This communication requirement, of course, is a very large problem when a grid contains many distributed generators (e.g., solar plants). When secondary control is enabled in the system in order to re-center the system voltage and frequency, the secondary control commands (also known as automatic generator control, or AGC) have to be broadcast to all entities participating in the system, whether loads, storage, generators, and/or meters, in order to prevent major discrepancies from happening in the system.

Tertiary controls operate in the long term (hours-days-months) to dimension the system (i.e., add more generation, improve transmission, and the like) as well as to achieve an economic optimization by balancing operation between resources for optimum cost (e.g., optimizing which generator should be active at a given time or which load should be active at a given time depending on cost of operation). In effect, the grid adapts as additional loading is added.

Any grid is assumed to supply power to and consume power from the conventional utility power grid. In essence, a localized grid is considered a power resource and/or load with respect to the utility grid. As such, the local grid and its members are subject to the three levels of grid control. Each member of the grid has their own residential power meter that records the flow of energy to and from the local grid. These members are commonly known as prosumers (producer-consumers). The grid member pays for their consumption of power from the utility power grid and, if the member produces more power than they consume, the member is compensated from the power utility. However, a member's over-production or over-consumption that impacts the other members of the grid is not penalized. Such impactful behavior may include over-production of power at in-opportune times, inefficient use of energy storage, and over-consumption at inappropriate times. In addition, local grids may not control voltage and frequency as well as is necessary to meet the primary control parameters. A well-executed power system should incentivize good behavior of its members and balance energy production and consumption within the local grid while avoiding utilizing utility grid power provided energy or over production of energy.

Therefore, there is a need for an improved grid member behavior control system.

SUMMARY OF THE INVENTION

Embodiments of the present invention generally relate to a method and apparatus for for controlling a behavior of at least one member of a local grid substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
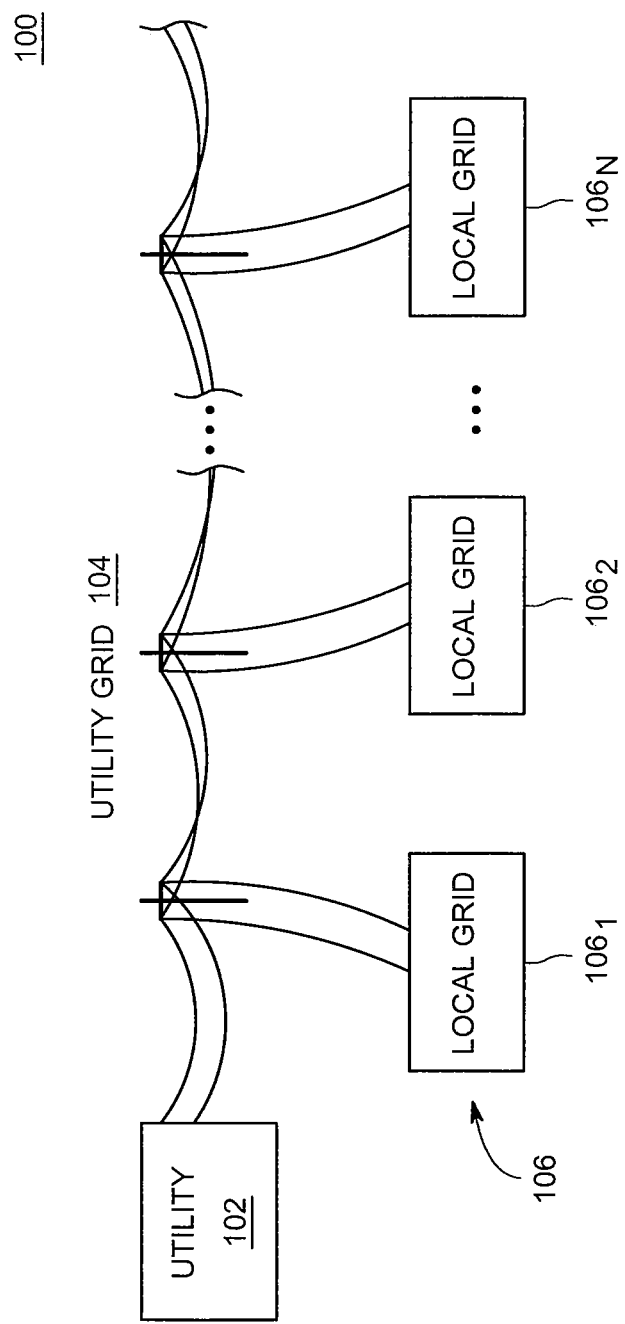
FIG. 1 depicts a block diagram of a power system including a plurality of local grids in accordance with one or more embodiments of the present invention.

Embodiments of the present invention comprise a monitoring system for a power grid that controls behavior of grid members, in particular a form of behavior-based tertiary control where optimization is based on the knowledge of operating conditions; to that extent, loads, meters, and the like, can publish (e.g., display) the current pricing, so that users can then change their behaviors. The monitoring system is coupled to a power meter within each member's facility (e.g., residence or business). Through monitoring the energy flow into and out of each grid member as well as computing a stress factor indicative of the stress of the grid at a member's power meter, the monitoring system performs a cost analysis to determine whether the behavior of each member is optimal for operation of the grid. Inappropriate behavior may result in additional charges, member notification to improve their behavior, removal from the grid, and the like. Appropriate behavior may be rewarded with member recognition, discounted energy and the like.

Embodiments of the present invention use grid voltage and frequency for universal messaging, i.e., changes in the grid voltage and frequency are used to adjust operation of the grid components. Each active component monitors grid voltage and frequency at a microsecond (or up to a second) level. As such, nearly instantaneous adjustments to generation, storage and loading are achieved without any command and control from a centralized control system, i.e., no need for secondary control. In such an environment, generators, storage and smart loads operate for the greater good (automatically maintain voltage and frequency within acceptable ranges).

To create such a holistic environment for grid control, a value for a desired quality of service (QoS) is established for each component within the micro-grid. The level of QoS defines the setting for voltage and frequency parameters in each component. Under such constraints, smart loads disconnect when the grid is overloaded, connect when the grid is underloaded, and modulate their operation as needed (e.g., HVAC, pumps, etc.). Generators automatically increase energy output or curtail energy output depending on the needs of the grid. Storage automatically absorbs energy or releases it depending on the needs of the micro-grid. All components work together to consume or generate reactive power in response to a grid voltage deviation from the nominal voltage level.

Billing per member is performed on a currency unit (e.g., dollars) per kilowatt-hour (kWh). Of course, any form of exchange or barter could be used. As such, typically, a member prosumer is billed for consuming energy, and they are paid for producing energy. However, in some instances, the consumption of energy is good for the system. In those instances, the member prosumer may be compensated for this behavior. In short, a member is charged for stressing the grid and compensated for de-stressing the grid. By establishing value incentives, prosumers' behavior optimizes the operation of the power grid for all of society. The billing algorithm is described in detail below.

FIG. 1 depicts a power system 100 comprising a utility 102, a utility grid 104, and a plurality of local grids $106_1$, $106_2$, ... $106_n$ (collectively and individually referred to as local grid 106). Through a connection to the utility grid 104, the local grid 106 as a whole may receive energy from the utility grid 104 or may place energy onto the utility grid 104. However, in some communities, placing energy on the grid is strictly controlled by regulation and it is beneficial that the local grid maintain or strive to maintain a zero output policy. A local grid may cover a neighborhood, or may cover a village or a small city. The definition of a local grid is not intended to imply a particular system size. The term local grid is used to indicate a system having a plurality of members that is capable of operating without energy being supplied from a conventional utility.

A zero output (or zero exchange) policy may exist for economic reasons (e.g., autarkic operation), environmental reasons (e.g., avoid polluting power sources) or practical infrastructure reasons (e.g., there is no intertie to a utility). In a zero output grid, the main operational objective is to maintain the net compensation exchange amongst members as near to zero as possible, e.g., there is no net profit or loss over the entire system. This is accomplished by valuing active and reactive power the same for all members at any particular time (spot value). Although the active and reactive power value will vary over time, all members are compensated at the spot value. As such, when the grid is stressed (i.e., not enough generation to meet consumption), the price of power rises to have members "sell" power into the grid from storage or increase production to meet demand.

Figure 2:
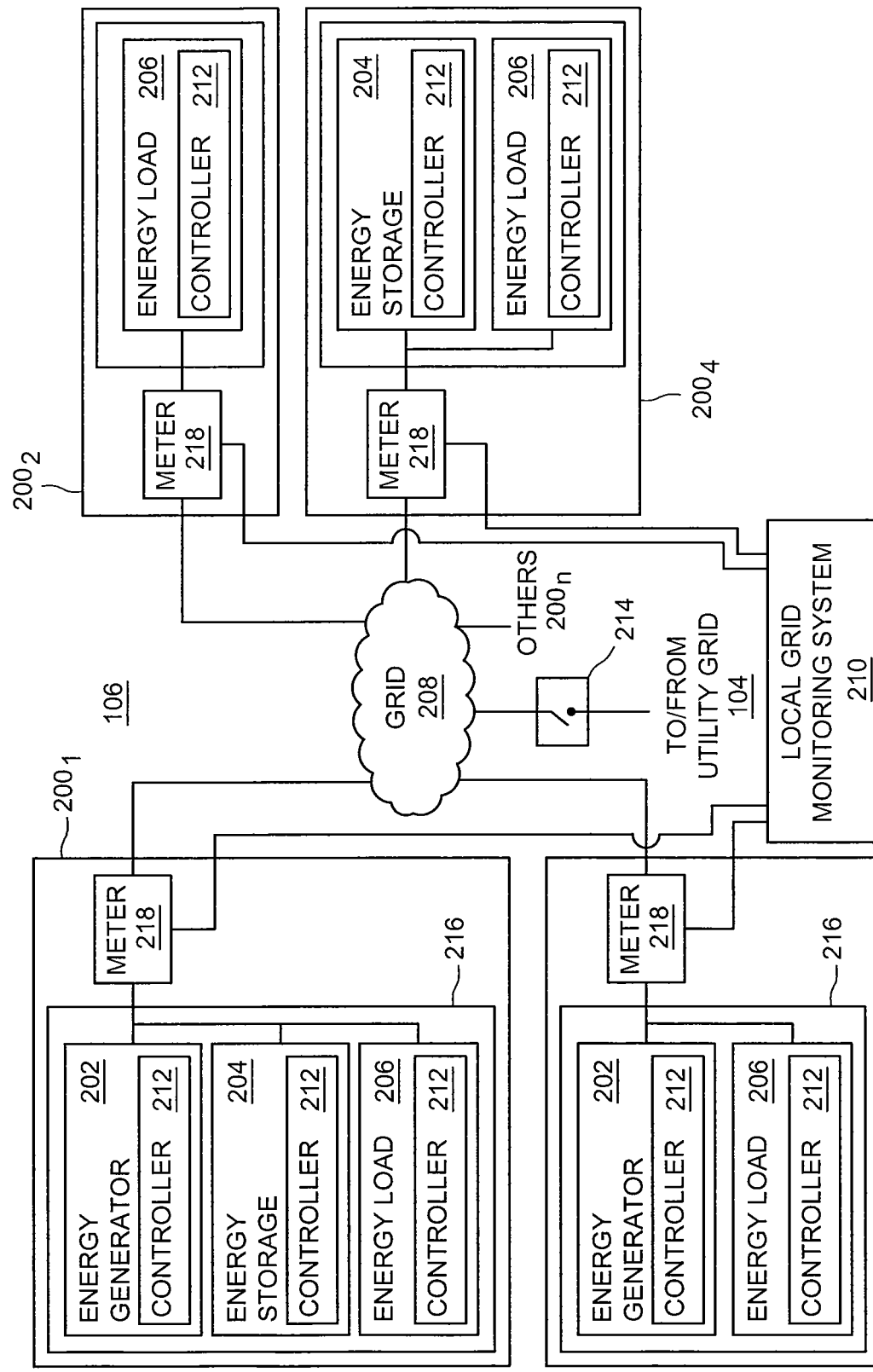
FIG. 2 depicts a block diagram of a local grid in accordance with one or more embodiments of the present invention.

FIG. 2 depicts a block diagram of a local grid 106 in accordance with an embodiment of the invention. The local grid 106 comprises a plurality of members $200_1$, $200_2$, $200_3$, $200_4$ ... $200_n$ that are coupled together to a grid 208. The grid 208 may be a trunk of the utility grid 104 or it may be a specifically designed micro-grid. The grid 208 is coupled to the utility grid 104 via a circuit breaker 214. Consequently, the utility 102 may disconnect the grid 208 from the utility grid 104, also known as "islanding", at times when the local grid 106 is either overproducing energy or overloading the utility grid 104. Typically, the local grid 106 strives to produce and consume a balanced amount of energy such that energy from the utility 102 is not needed.

Each member 200 of the local grid 106 comprises at least one component 216. Examples of components 216 within each member 200 comprise at least one of an energy generator 202, energy storage 204, and an energy load 206. For example, some members (e.g., $200_2$) may only have an energy load(s) 206, while others (e.g., $200_3$) may have an energy generator 202 (e.g., solar, wind, fuel cells, gas turbines, and the like) and an energy load(s) 206, and further members (e.g., $200_4$) may have energy storage 204 (e.g., battery, fly wheel, hot water and the like) and an energy load(s) 206. All the components shown have controllers and may be referred to as "smart" components; however, in a practical system, some loads may be "dumb" loads that do not have controllers and do not respond to changes in power consumption/generation. The controllers 212 of each "smart" component strive to balance the local grid's power generation and consumption as discussed below. In some embodiments, the loads may be independently controllable, such that, when the stress on the grid is deemed excessive, the loads can be disconnected from the grid.

Each component 216 includes a controller 212 that optimizes the operation of the components 216 within the corresponding member 200. Operation of the controller 212 is described with respect to FIG. 4 below. Generally, energy generation, storage, and load utilization is controlled to optimize the utilization of a member's energy resources using droop control. One example of such droop control is the hybrid droop control algorithms taught in K. De Brabandere, Voltage and Frequency Droop Control in Low Voltage Grids By Distributed Generators With Inverter Front End (October 2006) (Ph.D. dissertation; Catholic University of Leuven). The controller 212 of each component uses the local voltage and frequency to determine optimal consumption and/or generation of active and reactive power. Assuming all resources (components) of the local grid 106 abide by the hybrid droop control algorithms, the measuring of voltage and frequency at all times enables the controller 212 to estimate the real and reactive power needs of the local grid 106. A balanced grid will operate at a nominal frequency and voltage, while a grid that is stressed for reactive or real power will operate at a lower than nominal frequency and voltage, and a grid with excess real and reactive power will operate at a higher than nominal voltage and frequency.

Each member 200 also comprises a meter 218 for measuring the ingress and egress of energy for the corresponding member 200. The meter 218 measures real power flow (e.g., kilowatt hour, or kWh), reactive power flow (e.g., kilovolt-ampere reactive, or kVAr), grid frequency, and grid voltage (referred to herein as the measured parameters). These measured parameters are coupled to a monitoring system 210 via a communications network (e.g., wired, wireless, power line communications, and the like). The monitoring system 210 is coupled to the meter 218 of each member 200 to facilitate monitoring of the measured parameters throughout the local grid 106. Each meter 218 generally comprises an interconnect device (not shown) capable of islanding the member 200 when necessary. In some embodiments, the interconnect device may be external to the meter 218. Using specific algorithms, the monitoring system 210 can monitor and optimize behavior of each of the members 200 of the local grid 106. The meters 218 and monitoring system 210 are further described with respect to FIG. 3 below.

Figure 3:
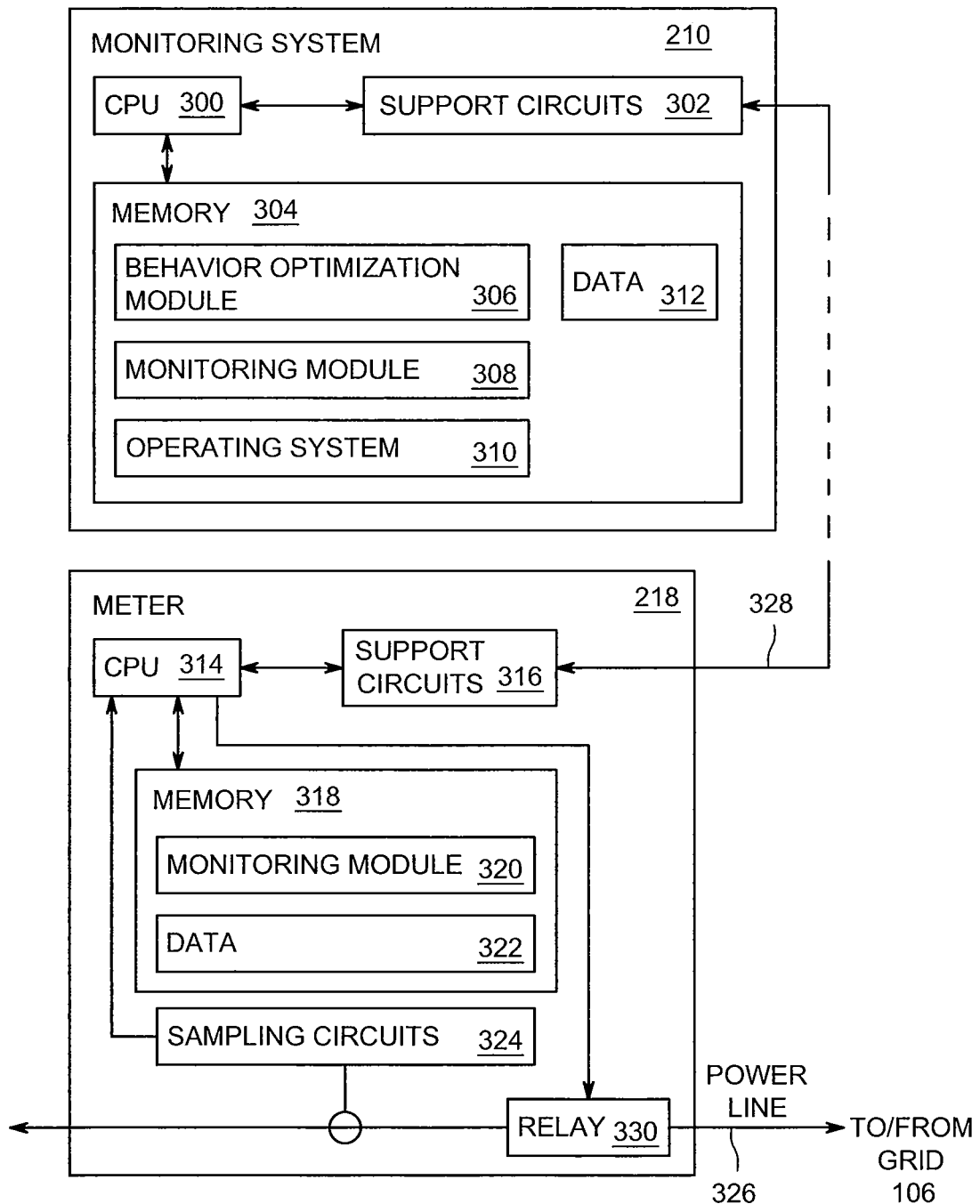
FIG. 3 depicts a block diagram of a local grid monitoring system and power meter in accordance with one or more embodiments of the present invention.

FIG. 3 depicts a block diagram of the monitoring system 210 and an associated meter 218 in accordance with at least one embodiment of the present invention. The meter 218 comprises a central processing unit (CPU) 314, support circuits 316, memory 318 and sampling circuits 324. The meter 218 is coupled to a communication network 328 and a power line 326. The CPU 314 may be one of any readily available processor or microcontroller. The support circuits 316 comprise a variety of circuits which facilitate operation of the CPU 314 comprising, but not limited to, clock circuits, cache, power supplies, displays and the like. The support circuits 316 provide an interface, (e.g., network card) to the communications network 328 to facilitate communicating data to the monitoring system 210. The memory 318 comprises at least one of random access memory and/or read only memory that stores program instructions (software) for the CPU 314. The software comprises a monitoring module 320. The memory 318 also stores data 322 collected as samples from the power line 326. The sampling circuits 324 measure real power flow (kWh), reactive power flow (kVAr), grid frequency and grid voltage. These measured parameters may be stored as data 322 or processed and/or filtered and stored as data 322, or both.

In one embodiment, the monitoring module 320 processes the data 322 to determine the grid stress for both reactive ($S_Q$) and real power ($S_P$). In other embodiments, the ($S_Q$, $S_P$) stress computation could be performed by each component 216, or by the monitoring system 210. The grid stress is indicative of the grid characteristics at the sampling point. As such, the grid stress is a local phenomenon computed, in one embodiment, at the meter of each member (real power P and reactive power Q can both be signed entities at any meter at any time). Based on the local stress, the monitoring system 210 establishes the value (which also may be referred to herein as an economic value) of real ($/kWh) and reactive ($/kVArh) power for the member associated with the stress. Consequently, good behavior can be rewarded and bad behavior is punished using variable power charging per member. Where the line impedance is $\vec{Z}=R+jx$ or $\vec{Z}=Ze^{j\theta}$ the value for real stress ($S_e$) and reactive stress ($S_Q$) are computed as follows:

$$f - f_0 = -K_P \frac{X}{Z}(P - P_0) + K_P \frac{R}{Z}(Q - Q_0)$$

$$U - U_0 = -K_Q \frac{R}{Z}(P - P_0) - K_Q \frac{X}{Z}(Q - Q_0)$$

P is normally positive 1 or power brought to the microgrid
$F_0$ is the nominal frequency
$U_0$ is the nominal voltage
$P_0$ is typically zero
$Q_0$ is normally Ø
$K_p$ is the real power droop gain in $H_z/w$
$K_Q$ is the reactive power droop in V/VAr
by introducing the normalized droop gain $\lambda_p$ and $\lambda_Q$ as:

$$\lambda_p = \frac{K_P P \max}{f_0}$$

where Pmax is the maximum asset power $$\lambda_Q = \frac{K_Q Q \max}{f_0}$$

where Qmax=Pmax, normally
the equation becomes:

$$\begin{bmatrix} \frac{\Delta f}{f_0} \\ \frac{\Delta U}{U_0} \end{bmatrix} = \begin{bmatrix} -\lambda_p \sin\theta & \lambda_p \cos\theta \\ -\lambda_Q \cos\theta & -\lambda_Q \sin\theta \end{bmatrix} \begin{bmatrix} \frac{P}{P\max} \\ \frac{Q}{Q\max} \end{bmatrix}$$

stress is defined on the grid by $$Sp = \frac{P}{P\max}$$

$S_P$=1 high stress in power injected $S_P = -1$ excess power available $$S_Q = \frac{Q}{Q\max}$$

then $$\begin{bmatrix} S_P \\ S_Q \end{bmatrix} = \begin{bmatrix} -\lambda_P \sin\theta & \lambda_P \cos\theta \\ -\lambda_Q \cos\theta & -\lambda_Q \sin\theta \end{bmatrix}^{-1} \begin{bmatrix} \frac{\Delta f}{f_0} \\ \frac{\Delta U}{U_0} \end{bmatrix}$$

$S_P$ and $S_Q$ can range between +1 and −1, where $$\begin{bmatrix} S_P \\ S_Q \end{bmatrix} = \begin{bmatrix} \frac{-\sin\theta}{\lambda_P} & \frac{-\cos\theta}{\lambda_Q} \\ \frac{\cos\theta}{\lambda_P} & \frac{-\sin\theta}{\lambda_0} \end{bmatrix} \begin{bmatrix} \frac{\Delta f}{f_0} \\ \frac{\Delta U}{U_0} \end{bmatrix}$$

In one embodiment, it is important for $\lambda_F$ and $\lambda_Q$ to be the same or similar for all assets in the microgrid.

As described below, the stress values Sp and $S_Q$ are used to establish energy costs throughout the grid.

The meter 218 further comprises a relay 330 that can be controlled to disconnect the member from the grid 106. As such, the member may be disconnected from the grid under various scenarios—the grid has anomalous voltage and frequency characteristics, the cost of energy from the grid is too high, and the like.

The monitoring system 210 comprises a central processing unit (CPU) 300, support circuits 302 and memory 304. The CPU 300 may be one of any readily available processor or microcontroller. The support circuits 302 comprise a variety of circuits which facilitate the operation of the CPU 300 comprising, but not limited to, clock circuits, cache, interface circuits, power supplies, displays, and the like. The support circuits 302 provide an interface (e.g., network card) to the meters 218. The memory 304 comprises at least one of random access memory and/or read-only memory that stores program instructions (software) for the CPU 300. The software comprises a behavior optimization module 306, a monitoring module 308, and an operating system 310; in some embodiments, the software may further comprise one or more databases for storing data related to the present invention (e.g., billings curves described below). The operating system 310 may comprise any one of a number of readily available operating systems compatible with the CPU 300, for example, WINDOWS, OSX, LINUX, and the like.

The monitoring module 308, when executed, causes the monitoring system 210 to gather and process data 312 received from the meters 218. The data 312 comprises the energy flow information representing energy flow direction (e.g., in to and out of each member 200), the magnitude of the energy and the composition of the energy (e.g., real and imaginary components). The composition of the energy is used to determine if the member is properly balancing VAr within the member's components. The monitoring module 308 may filter and/or aggregate the data received from the meters 218 before coupling the data to the behavior optimization module 306.

The behavior optimization module 306 is coupled to the monitoring module 308. The behavior optimization module 306, when executed, causes the monitoring system 210 to analyze the processed data from the monitoring module 308. The behavior optimization module 306 computes the power utilization of each of the members and determines whether the behavior of the members is optimal for the operation of the local grid. This optimal behavior may include a unity value of VAr for the micro-grid, a balanced energy generation and consumption to provide a zero output to the utility grid, no individual member is overproducing energy, no individual member is overloading the local grid, and the like. These attributes of behavior may be monitored over particular time periods to ensure the holistic operation of the micro-grid over time is optimized.

By analyzing the member behavior (i.e., computing and reviewing the grid stress level), members that locally behave inappropriately can be reprimanded either through notification or through increased costs (e.g., increased billing for power consumption or reduced payment for energy generation or outright fines). Ideally, the local grid should neither produce excess power nor consume power from the utility grid. As such, the members' production and consumption of real and reactive power should be balanced across the grid. If a particular member produces more power than that member requires for consumption or storage, then other members with either additional load or additional storage should consume the excess power. Likewise, if a member produces more power than that member requires for consumption or storage, and no other member is capable of consuming or storing the excess power, the member with the overproduction must curtail their production. The behavior optimization module creates financial incentives and disincentives to maintain balance of power generation within the micro-grid.

Figure 5:
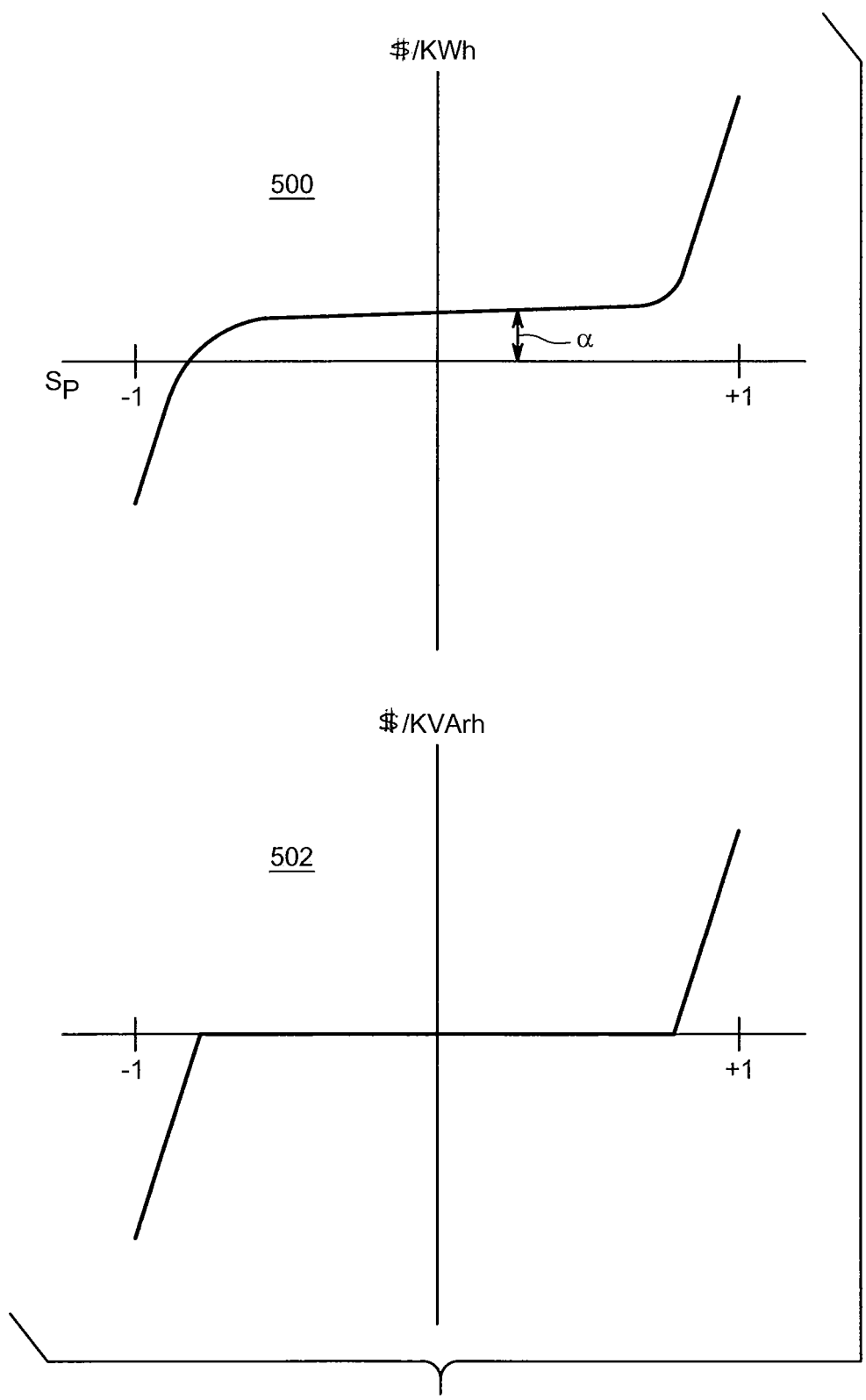
FIG. 5 depicts exemplary billing curves for real and reactive power control in accordance with one or more embodiments of the present invention.

To optimize behavior through financial incentives and disincentives, the monitoring system applies a billing curve based on the production or consumption of kWh and kVArh in view of the stress $S_P$ and $S_Q$. FIG. 5 depicts a billing curve 500 for real power production and consumption and a billing curve 502 for reactive power production and consumption. In the upper right-hand quadrant of billing curve 500, a member is charged for the consumption of power (e.g., positive $/kWh). As stress increases, the cost of power increases. In the upper left-hand quadrant of billing curve 500, a member is charged for production of power until the amount of power is large enough to cause compensation as the curve moves into the lower left hand quadrant. As stress increases toward −1, the value paid for power increases. In one embodiment of the invention, there is an offset of alpha (a) used in billing that represents a tax on all members to pay for the energy infrastructure that is common to all local grid members.

Turning to billing curve 502, in the upper right-hand quadrant, a member is billed for generating excesses reactive power which increases grid stress and in the lower right-hand quadrant, a member is compensated for consuming excessive reactive power. There is a buffer zone within the center of the billing curve where some reactive power may be generated or consumed at no cost and no compensation.

To guide behavior of grid members, the billing curves 500 and 502 may be adjusted to incentivize additional energy production, reduction of energy consumption, or reduction of reactive power. Depending on historical collection of the measured parameters, the billing curves may be unique to each member. In addition, the billing curves may be adjusted in view of the grid stress caused by a particular member. Consequently, the members would be paying extra when they stress the grid.

Figure 4:
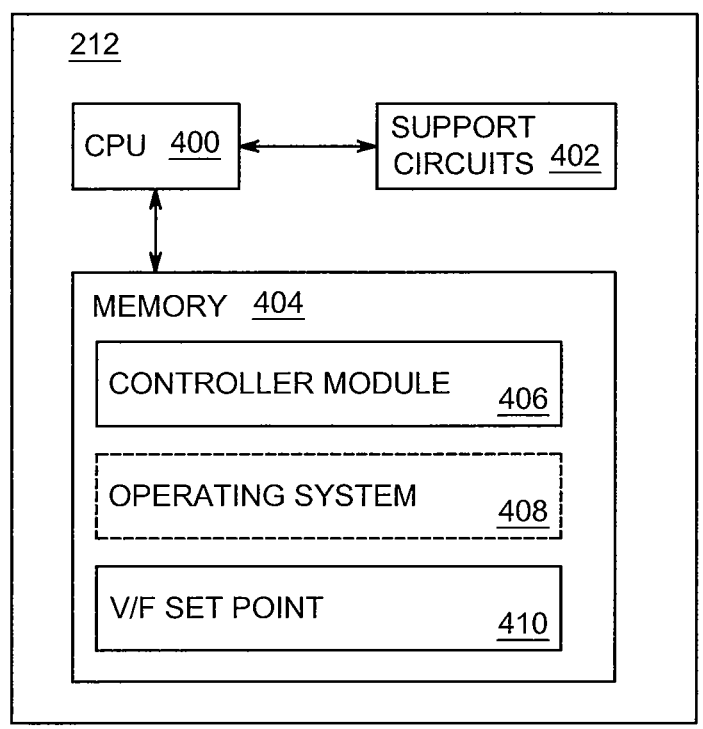
FIG. 4 depicts a block diagram of a local grid component controller in accordance with one or more embodiments of the present invention.

FIG. 4 depicts a block diagram of a component controller 212 in accordance with at least one embodiment of the invention. The controller 212 comprises a central processing unit (CPU) 400, support circuits 402 and memory 404. The CPU 400 may be one of any readily available processor or microcontroller. The support circuits 402 comprise a variety of circuits which facilitate the operation of the CPU 400 comprising, but not limited to, clock circuits, cache, interface circuits, power supplies, displays, and the like. The support circuits 402 provide an interface to the circuits of the component 216. The memory 404 comprises at least one of random access memory and/or read-only memory that stores program instructions (software) for the CPU 400. The software comprises a controller module 406 and, in some embodiments, an operating system 408. The operating system 410, which may not be necessary for some microcontrollers, may comprise any one of a number of readily available operating systems compatible with the CPU 400, for example, WINDOWS, OSX, LINUX, and the like.

In some embodiments, the controller 212 may be under the control of a master controller within the member facility. In other embodiments, the controller 212 may operate autonomously to control the behavior of the component without any direct interaction with the controller or other components within the member. This autonomous control occurs through continuous monitoring of grid voltage and frequency to adjust the behavior of the component in real time to maintain a desired grid voltage and frequency.

Within an autonomous embodiment, the controller module 406, when executed, facilitates automatic control of the component 216. The controller module 406 monitors the grid frequency and voltage at the output of the component to ensure that the frequency and voltage stay within designated parameters. By using localized droop control based upon the measured frequency and voltage, as described in commonly assigned U.S. patent application Ser. No. 15/048,651, filed Feb. 19, 2016; U.S. patent application Ser. No. 15/262,089, filed Sep. 12, 2016, U.S. patent application Ser. No. 15/180, 051, filed Jun. 12, 2016, U.S. patent application Ser. No. 15/369,363, filed Dec. 5, 2016, U.S. patent application 62/286,669, filed Jan. 25, 2016, U.S. patent application Ser. No. 15/415,531, filed Jan. 25, 2017, U.S. patent application Ser. No. 15/398,110, filed Jan. 4, 2017, and U.S. patent application Ser. No. 15/369,876, filed Dec. 5, 2016, each component can autonomously optimize its operation with respect to micro-grid.

The controller 212 may find use in any of the components 216 of a member 200. For example, the controller may optimize the generation of power from an energy generator 202, storage of energy within energy storage 204, or the consumption of energy within an energy load 206. Typically, the controller 212 within the energy generator 202 controls a DC/AC inverter such that output energy's real and reactive power generation are optimized for the local grid at any moment in time. The controller 212 within the energy storage 204, typically, controls the energy flow into and out of a storage unit such as a battery. In some embodiments, the energy flow is controlled by a DC/AC bidirectional inverter coupled to the battery to form an AC battery (ACB). The controller 212 within the energy load, typically, controls the amount of energy consumed by a plurality of devices within the member. This may include controlling the flow consumed by individual loads either through throttling the flow or turning on and turning off various loads at certain times.

The controller 212 in each component 216 contains a voltage and frequency (v/f) setpoint 410. This setpoint is used to establish an optimal operating constraint for the particular component. The setpoint can be established when the component is manufactured, can be updated periodically from a central setpoint controller, or can be updated in real time from a setpoint controller. In some embodiments, a master controller within the member facility or within the local grid may communicate an initial setpoint and/or setpoint updates. Typically though, setpoints are established once and not updated again. The v/f setpoint may include hysteresis around the setpoint to compensate for load/generator/storage turn on and off times. As such, setpoint hysteresis creates a v/f curve defining when and how components will be operated within the local grid.

The controller 212 samples the voltage and frequency at a sub-cycle rate (e.g., sub-milliseconds) and compares the samples to the setpoint values. Any deviation is quickly compensated to bring the function of the component in line with setpoint values.

To ensure that the addition of new loads on to the grid do not destabilize the grid, the loads are slowly added over multiple grid frequency cycles, i.e., new loads are eased onto the system so that the system has time to react. If energy generators on the grid can react in a sub-milliseconds timeframe, then easing the loads onto the grid is not as important.

In one embodiment, a member may monitor the performance of their components using a local monitoring system. As such, a member may review the compliance of their components with their setpoints.

Figure 6:
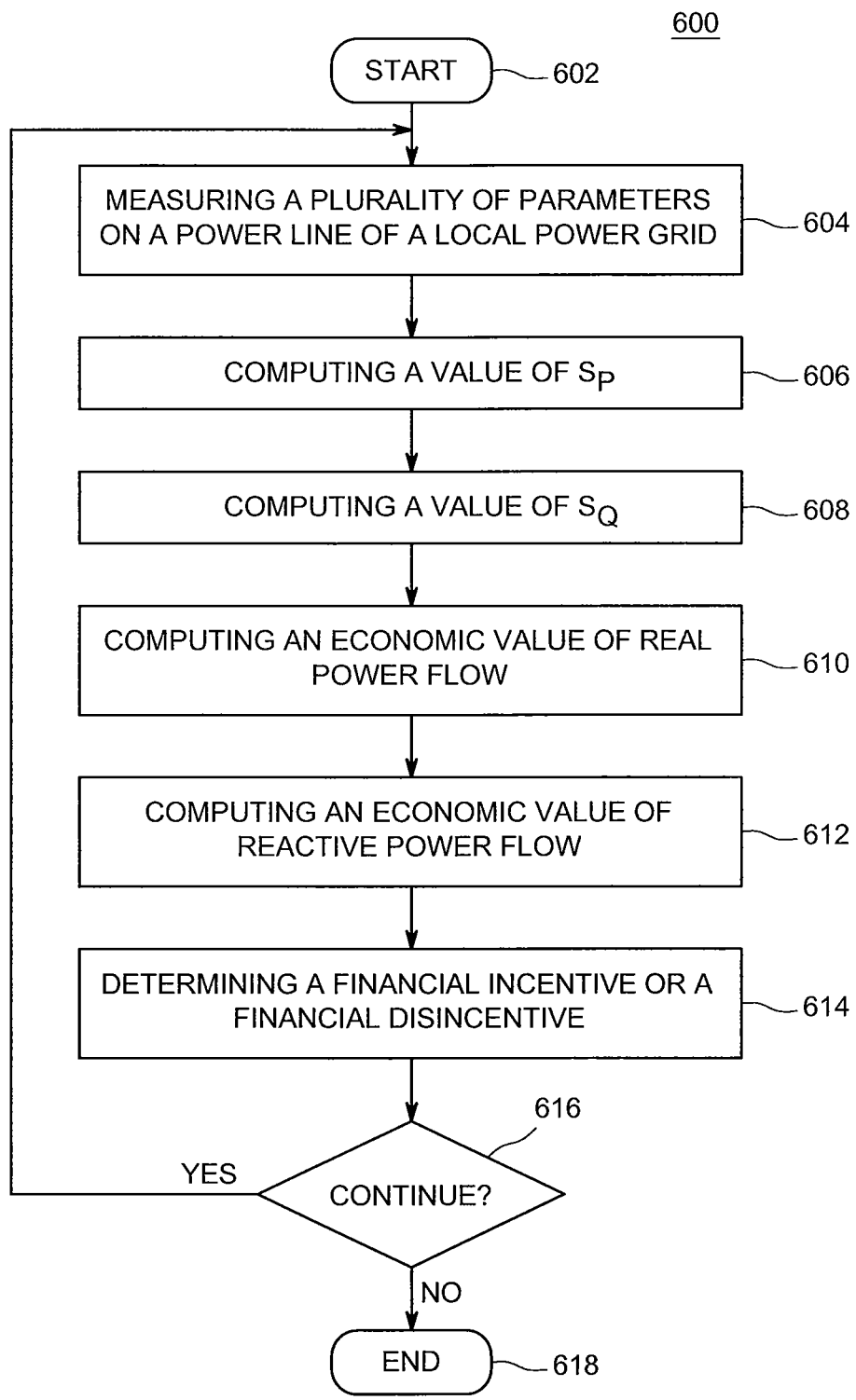
FIG. 6 is a flow diagram of a method for controlling a behavior of at least one member of a local grid in accordance with one or more embodiments of the present invention.

FIG. 6 is a flow diagram of a method 600 for controlling a behavior of at least one member of a local grid in accordance with one or more embodiments of the present invention. In one embodiment, some of the steps of the method 600 are an implementation of the monitoring system 210 while one or more other steps of the method 600 are an implementation of the meter 218. In some embodiments, a computer readable medium comprises a program that, when executed by a processor, performs at least a portion of the method 600 that is described in detail below.

The method 600 starts at step 602. At step 604, for each of at least one member of a local grid, such as a local grid 106, a plurality of parameters are measured on a power line of the local grid proximate to the member. Generally the plurality of parameters comprises real power flow (e.g., kilowatt-hour, or kWh), reactive power flow (e.g., kilovolt-ampere reactive hour, or kVArh), grid frequency, and grid voltage, although in certain embodiments other parameters may additionally or alternatively be measured. In some embodiments, a meter (e.g., meter 218) proximate to the member measures the corresponding plurality of parameters for the member.

The method 600 proceeds to step 606. At step 606, for each of the at least one member of the local grid, a value is computed for a first indicia, $S_P$, that represents an amount of grid stress associated with real power local to the member. The value for $S_P$ is computed as previously described. In some embodiments, the local meter computes the value, although in other embodiments a component of the member itself or a monitoring system for the local grid (e.g., monitoring system 210) may compute the value. The method 600 proceeds to step 608.

At step 608, for each of the at least one member of the local grid, a value is computed for a second indicia, $S_Q$, that represents an amount of grid stress associated with reactive power local to the member. The value for $S_Q$ is computed as previously described. In some embodiments, the local meter computes the value, although in other embodiments a component of the member itself or a monitoring system for the local grid (e.g., monitoring system 210) may compute the value. The method 600 proceeds to step 610.

At step 610, for each of the at least one member of the local grid, an economic value of real power flow is computed based on the corresponding value of $S_F$ for the member. The economic value may be a financial value, such as dollars/kWh, although other types of worth may be used. The economic value may be determined by applying a billing curve based on the production or consumption of real power in view of the stress $S_F$ as previously described, although other techniques for determining the economic value may be used. In some embodiments, the local grid monitoring system (e.g., monitoring system 210) may compute the economic value, although in other embodiments the economic value may be computed by the local power meter or a component of the member.

The method 600 proceeds to step 612. At step 612, for each of the at least one member of the local grid, an economic value of reactive power flow is computed based on the corresponding value of $S_Q$ for the member. The economic value may be a financial value, such as dollars/kVArh, although other types of worth may be used. The economic value may be determined by applying a billing curve based on the production or consumption of reactive power in view of the stress $S_P$ as previously described, although other techniques for determining the economic value may be used. In some embodiments, the local grid monitoring system (e.g., monitoring system 210) may compute the economic value, although in other embodiments the economic value may be computed by the local power meter or a component of the member.

The method 600 proceeds to step 614. At step 614, for each of the at least one member of the local grid, a financial incentive or a financial disincentive is determined based on the corresponding computed economic values for real and reactive power, an amount of real power flow with respect to the member, and an amount of reactive power flow with respect to the member. The financial incentive or disincentive is generally computed by the local grid monitoring system, although in other embodiments it may be computed by the local meter or a component of the member.

The method 600 proceeds to step 616, where a determination is made whether to continue. If the result of the determination is yes, the method 600 returns to step 604. If, at step 616, the result of the determination is no, the method 600 proceeds to step 618 where it ends.

While the foregoing is directed to embodiments of the present invention, other and further embodiments of the invention may be devised without departing from the basic scope thereof, and the scope thereof is determined by the claims that follow.

The invention claimed is:

1. A system for behavior-based tertiary control of a local grid comprising a member, comprising:
a meter associated with the member and connected to at least one of a smart energy generator, smart energy storage, or smart energy load each comprising a controller configured to balance power generation and consumption of the local grid based on data comprising at least grid frequency or grid voltage that are continuously and autonomously sampled at a predetermined rate by the controller and compared to periodically updated setpoint values in real time and without any direct interaction from the member with the controller; and a monitoring system operatively coupled to the controller of the meter and programmed to receive and process measured data to determine grid stress based on a production and consumption of both reactive power and real power of the member, establish an economic value for the production and consumption of the both reactive power and real power of the member based on a billing curve unique to the member, and determine a financial incentive for the member when the member produces more power than the member requires for consumption or storage and other members are capable of consuming the more power or a financial disincentive when the member produces the more power than the member requires for consumption or storage and the other members are not capable of consuming the more power to maintain balance of power generation within local grid, wherein the monitoring system is operatively coupled to a power line of the local grid and is further programmed to:
measure an amount of real power flow and an amount of reactive power flow at the power line to determine both the reactive power and real power of the member to establish energy costs throughout the local grid; and
disconnect the member from the local grid when a cost of energy from the local grid is too high.

2. The system of claim 1, wherein the monitoring system is further configured to establish the economic value by identifying a point on the billing curve that corresponds to the real power.

3. The system of claim 1, wherein the billing curve denotes values for the real power vs. financial amounts per kilowatt hour.

4. The system of claim 1, wherein a y-intercept of the billing curve is offset from zero by an amount that represents a tax on the member of the local grid.

5. The system of claim 1, wherein the monitoring system is further configured to establish the economic value by identifying a point on the billing curve that corresponds to the reactive power.

6. The system of claim 1, wherein the billing curve denotes values for the reactive power vs. financial amounts per kilovolt-ampere reactive hour.

7. A method for behavior-based tertiary control of a local grid comprising a member, comprising:
balancing, via a controller of a meter associated with the member and connected to at least one of a smart energy generator, smart energy storage, or smart energy load, power generation and consumption of the local grid based on data comprising at least grid frequency or grid voltage that are continuously and autonomously sampled at a predetermined rate by the controller and compared to periodically updated setpoint values in real time and without any direct interaction from the member with the controller;
receiving and processing, at a monitoring system operatively coupled to the controller of the meter and a power line of the local grid, measured data;
determining grid stress based on a production and consumption of both reactive power and real power of the member;

establishing an economic value for the production and consumption of both reactive power and real power of the member based on a billing curve unique to the member;

determining a financial incentive for the member when the member produces more power than the member requires for consumption or storage and other members are capable of consuming the more power or a financial disincentive when the member produces the more power than the member requires for consumption or storage and the other members are not capable of consuming the more power to maintain balance of power generation within local grid;

measuring an amount of real power flow and an amount of reactive power flow at the power line to determine both the reactive power and real power of the member to establish energy costs throughout the local grid; and disconnecting the member from the local grid when a cost of energy from the local grid is too high.

8. The method of claim 7, wherein the monitoring system is further configured to establish the economic value by identifying a point on the billing curve that corresponds to the real power.

9. The method of claim 7, wherein the billing curve denotes values for the real power vs. financial amounts per kilowatt hour.

10. The method of claim 7, wherein a y-intercept of the billing curve is offset from zero by an amount that represents a tax on the member of the local grid.

11. The method of claim 7, wherein the monitoring system is further configured to establish the economic value by identifying a point on the billing curve that corresponds to the reactive power.

12. The method of claim 7, wherein the billing curve denotes values for the reactive power vs. financial amounts per kilovolt-ampere reactive hour.

\* \* \* \* \*